(12) United States Patent
Kim et al.

(10) Patent No.: US 8,991,860 B2
(45) Date of Patent: Mar. 31, 2015

(54) EXTERNAL AIRBAG APPARATUS

(71) Applicant: Hyundai Motor Company, Seoul (KR)

(72) Inventors: Yong Sun Kim, Gyeonggi-d (KR); Seoung Hoon Lee, Gyeonggi-d (KR); Seung Mok Lee, Gyeonggi-d (KR); Jin Ho Bae, Gyeonggi-d (KR); Tae Wook Chung, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/856,606

(22) Filed: Apr. 4, 2013

(65) Prior Publication Data

US 2014/0151990 A1 Jun. 5, 2014

(30) Foreign Application Priority Data

Dec. 5, 2012 (KR) .................. 10-2012-0140137

(51) Int. Cl.
*B60R 21/36* (2011.01)
*B60R 19/20* (2006.01)
*B60R 19/18* (2006.01)
*B60R 21/34* (2011.01)

(52) U.S. Cl.
CPC ............... *B60R 19/205* (2013.01); *B60R 21/36* (2013.01); *B60R 19/18* (2013.01); *B60R 2021/346* (2013.01); *B60R 2019/1866* (2013.01)
USPC ............................ 280/770; 280/762; 293/107

(58) Field of Classification Search
CPC .... B60R 21/00; B60R 21/0136; B60R 21/34; B60R 21/36; B60R 2021/34; B60R 2021/343; B60R 2021/346; B60R 19/02; B60R 19/023; B60R 19/04; B60R 19/14; B60R 19/18

USPC ........... 280/762, 770, 728.2, 730.1; 340/436; 293/107, 110, 132; 180/271, 274
See application file for complete search history.

(56) References Cited

U.S. PATENT DOCUMENTS

| 4,635,981 | A  | * | 1/1987  | Friton .............................. 293/1 |
| 5,425,561 | A  | * | 6/1995  | Morgan ........................ 293/120 |
| 6,637,788 | B1 | * | 10/2003 | Zollner et al. ................ 293/107 |
| 7,036,621 | B2 | * | 5/2006  | Takafuji et al. ............... 180/274 |

(Continued)

FOREIGN PATENT DOCUMENTS

| DE | 10339031 A1 | * | 3/2004 |
| DE | 10256956 A1 | * | 7/2004 |

(Continued)

OTHER PUBLICATIONS

Raw machine translation of JP 2004/268627 A.*

*Primary Examiner* — J. Allen Shriver, II
*Assistant Examiner* — Steve Clemmons
(74) *Attorney, Agent, or Firm* — Mintz Levin Cohn Ferris Glovsky and Popeo, P.C.; Peter F. Corless

(57) ABSTRACT

Disclosed is an external airbag apparatus. The apparatus includes, a back beam disposed on one surface directed toward a bumper on which an airbag module is disposed. The apparatus additionally includes a deployment guide disposed between the bumper and the back beam, both ends of which are coupled to the back beam, and a middle end of which is supported on the bumper. Furthermore, the apparatus includes a sensor disposed between the deployment guide and the back beam to sense impact when pressed by the deployment guide during impact to the bumper.

9 Claims, 5 Drawing Sheets

(56) References Cited

U.S. PATENT DOCUMENTS

| | | | |
|---|---|---|---|
| 7,174,985 B2 * | 2/2007 | Sawa et al. | 180/274 |
| 7,222,897 B2 * | 5/2007 | Evans et al. | 293/120 |
| 7,258,191 B1 * | 8/2007 | Rammer | 180/274 |
| 7,275,775 B2 * | 10/2007 | Park et al. | 293/102 |
| 7,287,618 B2 * | 10/2007 | Okamoto et al. | 180/274 |
| 7,347,464 B2 * | 3/2008 | Tanabe | 293/4 |
| 7,357,212 B2 * | 4/2008 | Sasaki et al. | 180/274 |
| 7,364,222 B2 * | 4/2008 | Tanabe | 296/187.03 |
| 7,516,993 B2 * | 4/2009 | Bouchez et al. | 293/120 |
| 7,541,917 B2 * | 6/2009 | Hosokawa | 340/436 |
| 7,784,817 B2 * | 8/2010 | Choi et al. | 280/728.2 |
| 7,804,414 B2 * | 9/2010 | Kiribayashi | 340/614 |
| 7,954,864 B2 * | 6/2011 | Frederick et al. | 293/120 |
| 7,967,098 B2 * | 6/2011 | Choi | 180/274 |
| 8,368,523 B2 * | 2/2013 | Takahashi et al. | 340/436 |
| 8,473,188 B2 * | 6/2013 | Tanabe | 701/301 |
| 2003/0075373 A1 * | 4/2003 | Sawa et al. | 180/271 |
| 2005/0116817 A1 * | 6/2005 | Mattes et al. | 340/436 |
| 2005/0269805 A1 * | 12/2005 | Kalliske et al. | 280/730.1 |
| 2006/0055187 A1 * | 3/2006 | Jaarda et al. | 293/133 |
| 2006/0082169 A1 * | 4/2006 | Kuhne | 293/102 |
| 2006/0103514 A1 * | 5/2006 | Hosokawa | 340/436 |
| 2007/0057490 A1 * | 3/2007 | Deflorimonte | 280/730.1 |
| 2007/0138815 A1 * | 6/2007 | Fukukawa et al. | 293/15 |
| 2007/0198155 A1 * | 8/2007 | Danisch | 701/45 |
| 2007/0262569 A1 * | 11/2007 | Kikuchi et al. | 280/728.3 |
| 2008/0060450 A1 * | 3/2008 | Bischoff et al. | 73/862.041 |
| 2008/0258887 A1 * | 10/2008 | Gelberi et al. | 340/436 |
| 2009/0045607 A1 * | 2/2009 | Fukuyama et al. | 280/728.2 |
| 2009/0102167 A1 * | 4/2009 | Kitte et al. | 280/728.2 |
| 2010/0013250 A1 * | 1/2010 | Suzuki et al. | 293/132 |
| 2010/0232739 A1 * | 9/2010 | Nowsch | 385/13 |
| 2011/0018237 A1 * | 1/2011 | Choi et al. | 280/728.2 |
| 2012/0146347 A1 * | 6/2012 | Huang et al. | 293/132 |

FOREIGN PATENT DOCUMENTS

| | | | |
|---|---|---|---|
| JP | 2004268627 A | * | 9/2004 |
| JP | 2007055530 A | | 3/2007 |
| KR | 1019970074350 A2 | | 12/1997 |
| KR | 10-2010-0018747 | | 2/2010 |
| KR | 1020110006743 | | 1/2011 |
| KR | 101154266 | | 6/2012 |
| WO | WO 03053751 A1 | * | 7/2003 |
| WO | WO 03082639 A1 | * | 10/2003 |
| WO | WO 2004058545 A1 | * | 7/2004 |
| WO | WO 2006123236 A1 | * | 11/2006 |

* cited by examiner

EXTERNAL AIRBAG APPARATUS

CROSS-REFERENCE TO RELATED APPLICATION

This application claims under 35 U.S.C. §119(a) the benefit of Korean Patent Application No. 10-2012-0140137 filed on Dec. 5, 2012 the entire contents of which are incorporated herein by reference.

BACKGROUND (a) Technical Field

The present invention relates to an external airbag apparatus, and more particularly, to an external airbag apparatus in which a sensor configured to sense impact with a pedestrian is mounted in a bumper together with an airbag module to absorb the impact force applied to the bumper, through an absorption structure provided on a deployment guide.

(b) Background Art

Generally, an external airbag is mounted inside a bumper and operates to reduce passenger injury risk by sensing a collision circumstance in advance, deploying an airbag cushion prior to the collision occurring to enlarge a space for absorbing impact energy, and decreasing impact applied to the passenger.

Furthermore, for the external airbag to operate as a buffer during a vehicle, a gas pressure in an airbag must be increased and a size of an airbag cushion must be increased to substantially absorb the impact energy to thereby decrease impact felt by the passenger.

FIG. 1 is an exemplary view illustrating an external airbag according to a related art wherein a center of a front end of a back beam 1 is dented toward a rear end thereof and an airbag module 2 is mounted on the indented portion to form the external airbag.

Moreover, recently, various technologies have been developed to protect a pedestrian during a vehicle collision using an active hood system that protects a head of a pedestrian and a pedestrian airbag apparatus. In particular, a sensor configured to sense the impact applied to a pedestrian is mounted on a front end of a back beam, wherein pedestrian protection is increased when the sensor is capable of sensing the collision impact.

However, since the airbag module and the sensor overlap and are mounted on the front end of the back beam and, it may difficult to simultaneously install the sensor and the airbag module.

The description provided above as a related art of the present invention is just for helping understanding the background of the present invention and should not be construed as being included in the related art known by those skilled in the art.

SUMMARY

The present invention provides an external airbag apparatus in which a sensor configured to sense impact with a pedestrian is mounted in a bumper together with an airbag module. Specifically, the present invention provides an external airbag in which an absorption structure is disposed on a deployment guide to absorb the impact force during a vehicle collision to reduce pedestrian injury.

In one embodiment, the external airbag apparatus may include a back beam disposed on one surface directed toward a bumper; a deployment guide disposed between the bumper and the back beam, both ends of which are coupled to the back beam, and a middle end of which is supported on the bumper; and a sensor disposed between the deployment guide and the back beam configured to sense impact when pressed by the deployment guide during impact on the bumper.

An absorption portion may be formed between one end and a middle end of the deployment guide and the absorption portion may be deformed by the compression force applied to the bumper when impact is applied to the bumper to absorb the impact.

The impact absorption portion may include a plurality of ribs wherein a front end and a rear end of the deployment guide are coupled to the ribs, and an absorption space disposed between the ribs wherein each rib and the absorption space are disposed alternatively along left and right longitudinal direction of the deployment guide.

The plurality of ribs may include a horizontal rib formed in a horizontal direction to the deployment guide and a vertical rib formed in a vertical direction to the deployment guide. The horizontal rib and the vertical rib may be arranged alternatively.

A first support surface and a second support surface may be formed in a longitudinal direction on the upper end of the deployment guide and the upper end of the back beam, which are in contact with the front end surface and the rear end surface of the sensor, respectively wherein the sensor may be supported between the first support surface and the second support surface.

Furthermore, the sensor may be disposed between the deployment guide and the back beam to allow the compression force by the deployment guide to transfer to the sensor. The sensor may be an optical fiber sensor disposed in a left and right width direction between the deployment guide and the back beam.

A form member having elastic force may be disposed between the deployment guide and the back beam. In addition, the sensor may be disposed inside the form member and thus the compression force by the deployment guide may be transferred to the sensor through the elastic force of the form member.

BRIEF DESCRIPTION OF THE DRAWINGS

The above and other features of the present invention will now be described in detail with reference to exemplary embodiments thereof illustrated in the accompanying drawings which are given hereinbelow by way of illustration only, and thus are not limitative of the present invention, and wherein.

Figure 1:
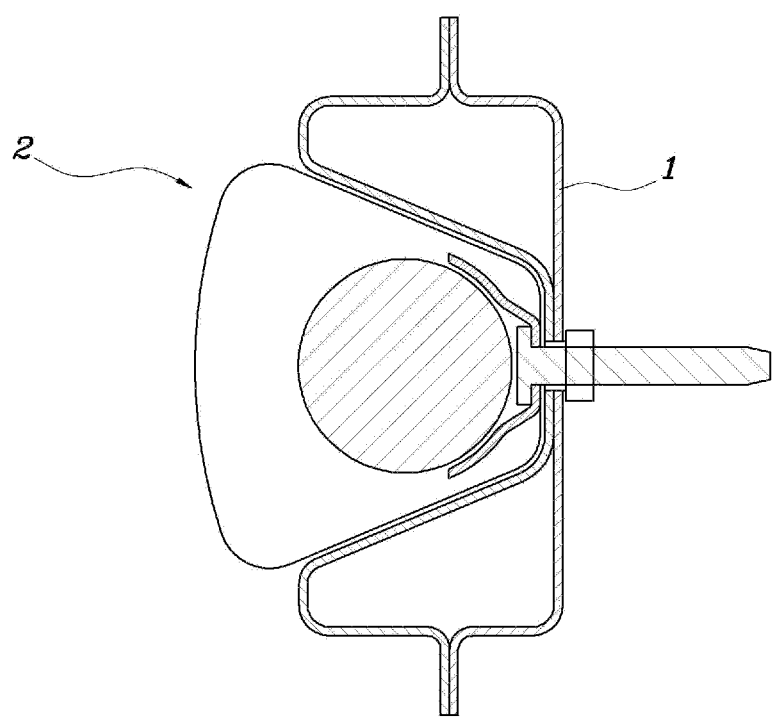
FIG. 1 is an exemplary view showing an external airbag according to a related art.

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinbelow, exemplary embodiments of the present invention will be described in details with reference to the accompanying drawings.

Figure 2:
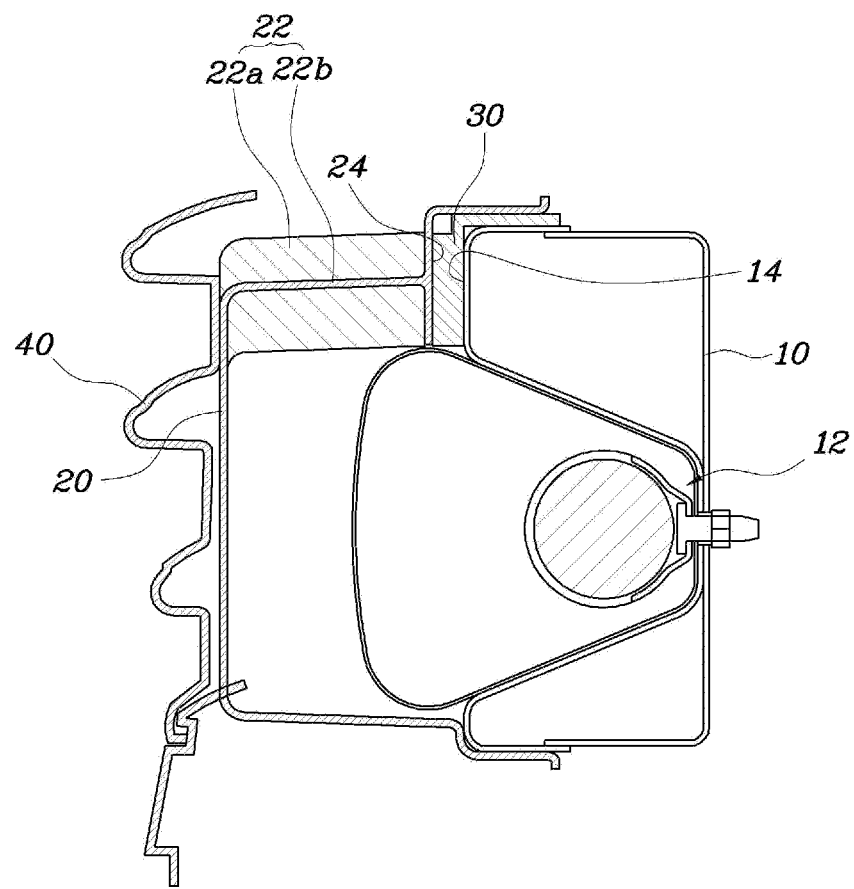
FIG. 2 is an exemplary view showing an external airbag having a sensor according to an exemplary embodiment of the present invention.

FIG. 2 is an exemplary view showing an external airbag having a sensor according to an exemplary embodiment of the present invention. Referring to FIG. 2, the external airbag apparatus may include a back beam 10, a deployment guide 20 and a sensor 30.

Specifically, the external airbag may include the back beam 10 disposed on one surface toward a bumper 40 on which an airbag module 12 is disposed; the deployment guide 20 may be disposed between the bumper 40 and the back beam 10, both ends of which may be coupled to the back beam 10, and a middle end of which may be supported on the bumper 40; and the sensor 30 may be disposed between the deployment guide 20 and the back beam 10 to sense impact pressed by the deployment guide 20 when the bumper 40 is impacted. Furthermore, the back beam 10 may be coupled to a vehicle body through a side member (not shown), etc., and may be installed inside the bumper 40.

Moreover, the inner configuration of the bumper 40 disposed on a front part of the airbag apparatus, may include a center of the front end of the back beam 10, wherein the center may be dented lengthwise toward a front end and the airbag module 12 may be installed on the indented portion. In particular, the airbag module 12 may be a module configuration in which an airbag cushion and an inflator are coupled to a coupling bracket.

The deployment guide 20 may be disposed between the bumper 40 and the back beam 10 wherein an upper end thereof is coupled to an upper end of the back beam 10, an lower end thereof is coupled to a lower end of the back beam 10, and a middle end thereof is supported on an inner side surface of the bumper 40. Furthermore, the deployment guide 20 may be shaped to surround the airbag module 12 to guide a deployment of an airbag cushion when the airbag cushion is deployed. In particular, the bumper 40 may be installed on a front part of the deployment guide 20.

The sensor 30 may be installed between an upper end of the deployment guide 20 and an upper end of the back beam 10 wherein the bumper 40 may be configured to push the deployment guide 20 when impact force is applied to the bumper 40 and the deployment guide may compress the sensor 30 that is configured to sense the impact applied to the bumper 40.

In other words, when impact force caused from a vehicle collision is applied to the bumper 40, the bumper 40 may be pushed toward the back beam 10 and the deployment guide 20 supported on the bumper 40 may be pushed toward the back beam 10. Accordingly, the upper end of the deployment guide 20 may compress the sensor 30 wherein the impact force applied to the bumper 40 may be sensed through the sensor 30.

As a result, when a vehicle collides with a pedestrian, an airbag cushion of the external airbag may be deployed by sensing the pedestrian. Furthermore, a first support surface 14 and a second support surface 24 may be formed in a longitudinal direction on the upper end of the deployment guide 20 and the upper end of the back beam 10, which are in contact with the front end surface and the rear end surface of the sensor 30, respectively wherein the sensor 30 may be supported between the first support surface 14 and the second support surface 24. In other words, the first support surface 14 and the second support surface 24 may be formed to accommodate the sensor therebetween.

Figure 3:
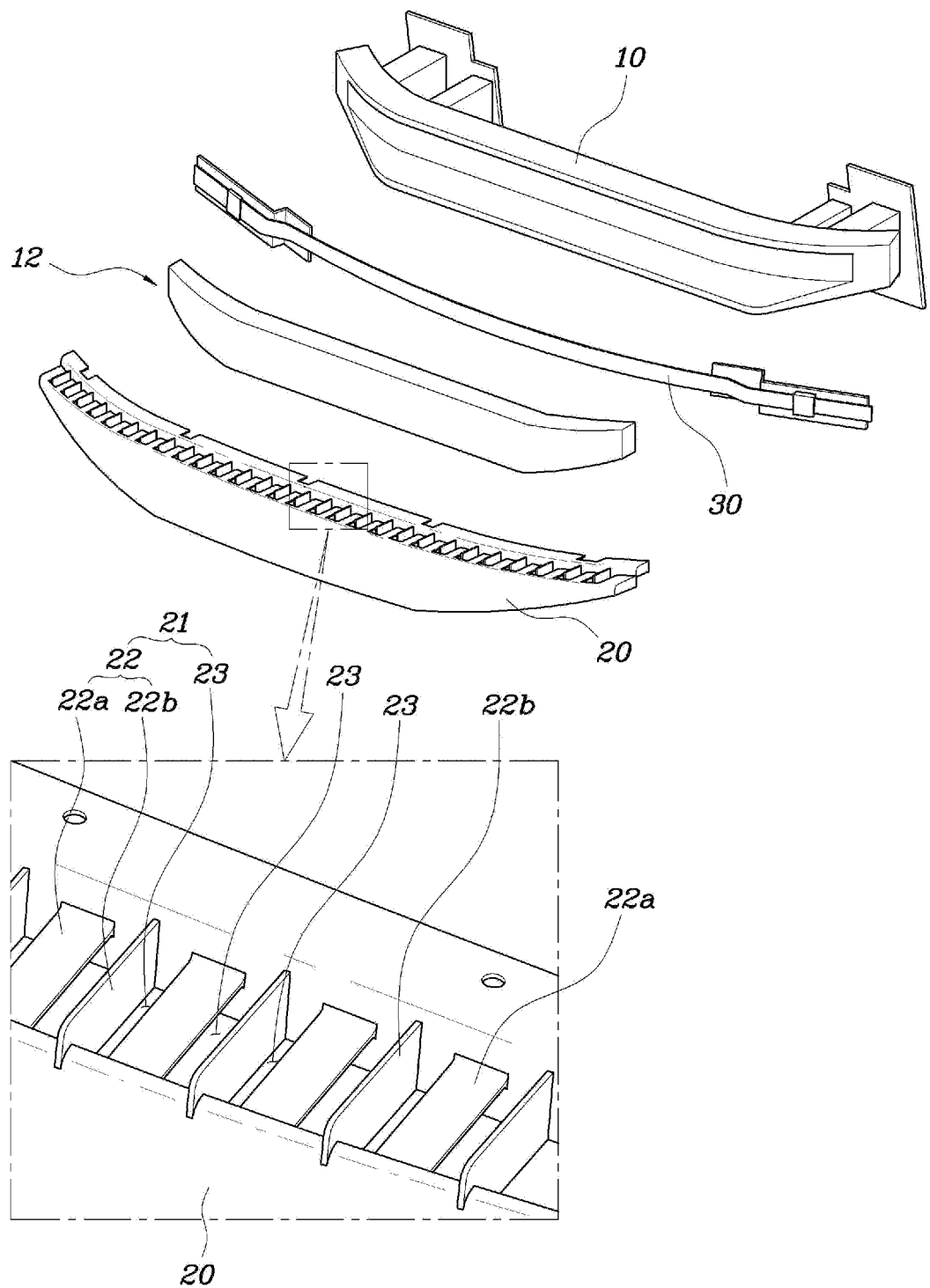
FIG. 3 shows an external airbag.

Referring to FIGS. 2 and 3, the compression force applied through the deployment guide 20 may be transferred directly to the sensor 30. In other words, the sensor 30 may be disposed between the deployment guide 20 and the back beam to be in face contact therewith to allow the compression force by the deployment guide 20 to be transferred to the sensor 30. In particular, the sensor 30 may be an optical fiber sensor disposed in a horizontal direction and the compression force by the deployment guide 20 may be transferred to the sensor 30 to improve sensing performance of the sensor 30.

Figure 4:
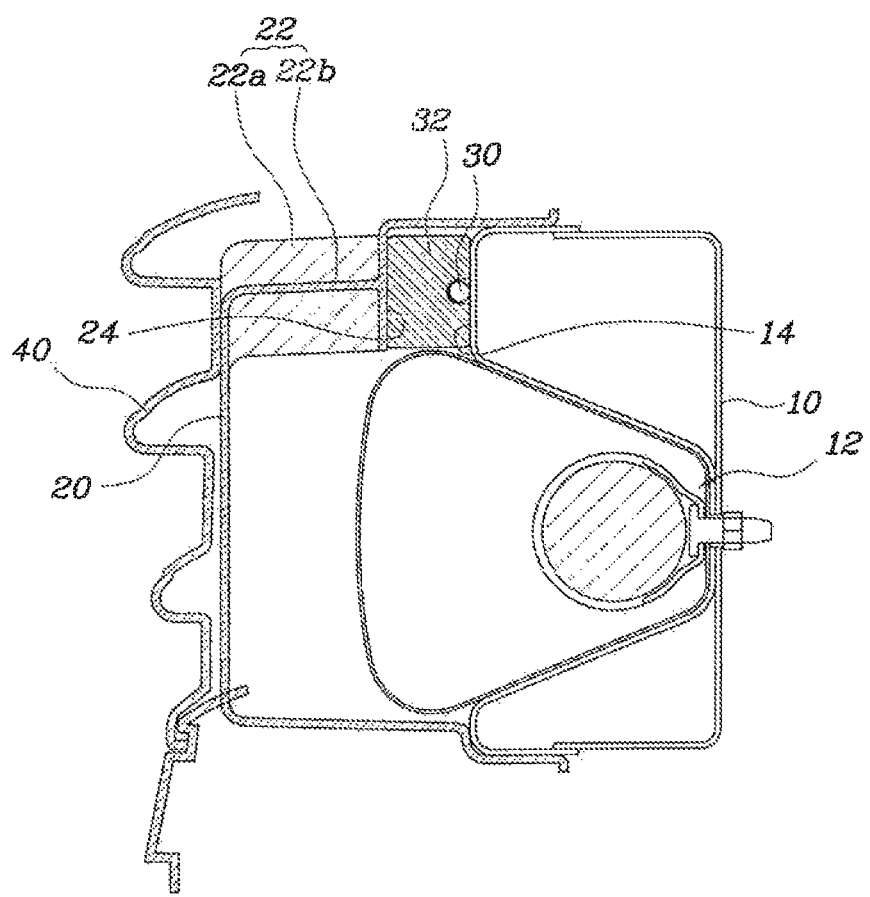
FIG. 4 is an exemplary view showing the external airbag having a sensor according to an exemplary embodiment the present invention.

As another example of the sensor 30, referring to FIG. 4, the compression force applied through the deployment guide 20 may be transferred to the sensor 30 through a separate form member 32. In particular, the form member 32 having elastic force may be disposed between the deployment guide 20 and the back beam 10. Furthermore, the sensor 30 may be disposed inside the form member 32 and thus the compression force by the deployment guide 20 may be transferred to the sensor through the elastic force of the form member 32.

Moreover, the form member 32 may be made of polypropylene (PP). In other words, when the form member 32 is pressed by the compression force through the deployment guide 20, the compression force may be transferred to the sensor 30 by the pressing force and the impact force applied to the bumper may be buffered through the form member 32.

Figure 5:
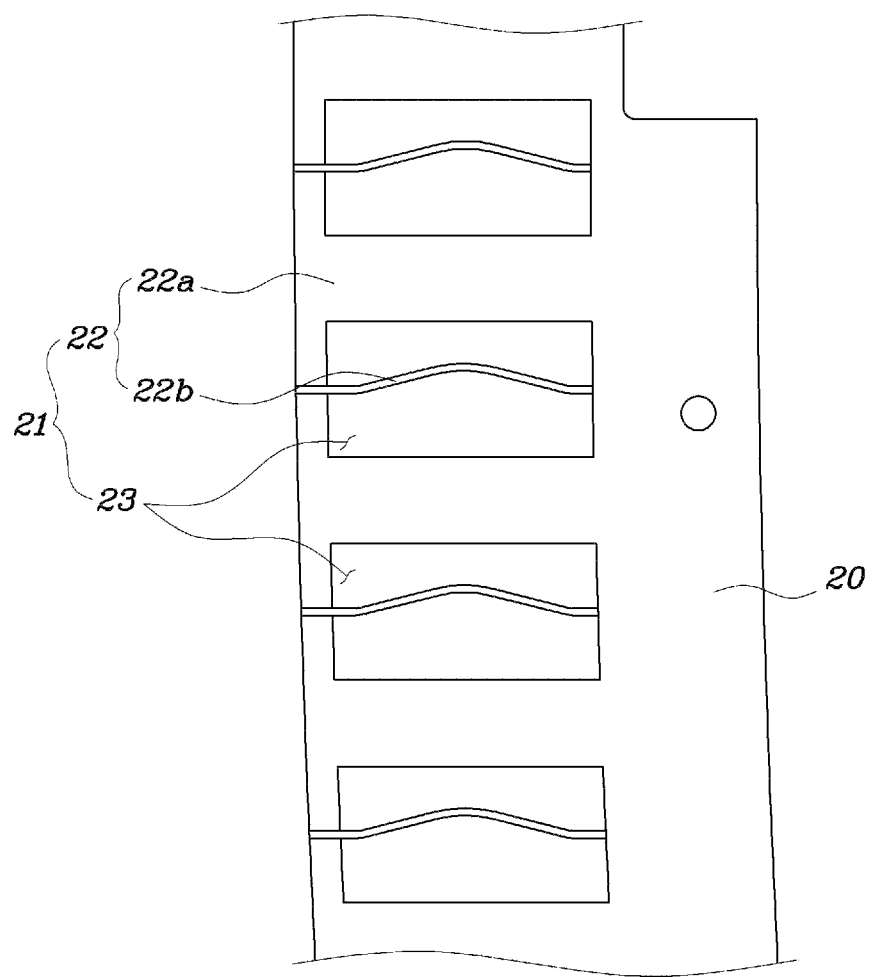
FIG. 5 is an exemplary view showing impact absorption operation of an impact absorption portion according to an exemplary embodiment the present invention.

FIG. 3 is an exemplary detailed view showing an external airbag while showing an enlarged impact absorption portion 21 according to an exemplary embodiment of the present invention and FIG. 5 is an exemplary view showing impact absorption operation of an impact absorption portion 21 according to an exemplary embodiment of the present invention.

Referring to FIGS. 3 and 5, the impact absorption portion 21 may be disposed between an upper end and a middle end of the deployment guide 20. In particular, the impact absorption portion 21 may be deformed by the compression force applied to the bumper 40 when the bumper is impacted.

In other words, when the deployment guide 20 is pushed due to impact of the bumper 40, the impact absorption portion 21 may be bent to reduce the impact force applied to the bumper 40. Accordingly, when a vehicle collides with a pedestrian, the impact force applied to the pedestrian may be reduced to decrease pedestrian injury.

Furthermore, the impact absorption portion 21 may include a plurality of ribs 22 and an absorption space 23. In particular, the front end and the rear end of the deployment guide 20 may be coupled to the ribs 22, and the absorption space 23 may be disposed between the ribs 22 wherein each rib 22 and the absorption space 23 may be formed alternatively along a longitudinal direction of the deployment guide 20 to form the impact absorption portion 21.

Furthermore, the ribs 22 may include a horizontal rib 22a and a vertical rib 22b. In other words, the ribs 22 may include the horizontal rib 22a formed in a horizontal direction to the deployment guide 20 and the vertical rib 22b formed in a vertical direction to the deployment guide 20. Additionally, the horizontal rib 22a and the vertical rib 22b may be arranged alternatively.

Specifically, the horizontal rib 22a, the absorption space 23, the vertical rib 22b, and the absorption space 23 may be arranged repeatedly along a longitudinal direction of the deployment guide 20 between the front end and the rear end thereof. Accordingly, when the impact force is applied to the bumper 40, the vertical rib 22b and the horizontal rib 22a may be bent within the absorption space 23 to absorb the impact force applied to a pedestrian colliding with the bumper 40 thereby reducing the pedestrian injury.

According to the external airbag of the present invention, a sensor may be disposed between a back beam and a deployment guide and an airbag module may be installed on the back beam to allow the airbag module and the sensor to be installed inside the bumper. Specifically, the sensor may be pushed through the deployment guide that is pushed by the bumper when a vehicle collides to sense the impact force. Accordingly, the air cushion and other protection devices for protecting a pedestrian may be operated with sensing operation of the sensor.

Furthermore, when the impact force is applied to the bumper, a rib formed on the deployment guide may bend within an absorption space to absorb the impact force of a pedestrian that collides with the bumper thereby reducing pedestrian injury.

The invention has been described in detail with reference to exemplary embodiments thereof. However, it will be appreciated by those skilled in the art that changes or modifications may be made in these embodiments without departing from the principles and spirit of the invention, the scope of which is defined in the accompanying claims and their equivalents.

What is claimed is:

1. An external airbag apparatus comprising:
   a back beam disposed on one surface directed toward a bumper on which an airbag module is disposed;
   a deployment guide disposed between the bumper and the back beam, both ends of which are coupled to the back beam, and a middle end of which is supported on the bumper; and
   a sensor disposed between the deployment guide and the back beam to sense impact when pressed by the deployment guide due to impact on the bumper.

2. The external airbag apparatus according to claim 1, further comprising:
   an absorption portion formed between one end and a middle end of the deployment guide, wherein the absorption portion is deformed by the compression force applied to the bumper when the bumper is impacted.

3. The external airbag apparatus according to claim 2, wherein the impact absorption portion includes:
   a plurality of ribs, wherein a front end and a rear end of the deployment guide are coupled to the plurality of ribs; and
   an absorption space disposed between each rib wherein the plurality of ribs and the absorption space are disposed alternatively in a longitudinal direction of the deployment guide.

4. The external airbag apparatus according to claim 3, wherein the plurality of ribs include a horizontal rib formed in a horizontal direction to the deployment guide and a vertical rib formed in a vertical direction to the deployment guide.

5. The external airbag apparatus according to claim 4, wherein the horizontal rib and the vertical rib are arranged alternatively.

6. The external airbag apparatus according to claim 1, further comprising:
   a first support surface and a second support surface formed in a longitudinal direction on the upper end of the deployment guide and the upper end of the back beam, which are in contact with the front end surface and the rear end surface of the sensor, respectively wherein the sensor may be supported between the first support surface and the second support surface.

7. The external airbag apparatus according to claim 1, wherein the sensor is disposed between the deployment guide and the back beam to be in contact therewith to allow the compression force by the deployment guide to be transferred to the sensor.

8. The external airbag apparatus according to claim 7, wherein the sensor is an optical fiber sensor disposed in a horizontal direction between the deployment guide and the back beam.

9. The external airbag apparatus according to claim 1, further comprising:
   a form member having elastic force disposed between the deployment guide and the back beam, wherein the sensor is disposed inside the form member to transfer compression force by the deployment guide to the sensor through the elastic force of the form member.

* * * * *